United States Patent
Todd et al.

(10) Patent No.: US 9,356,961 B1
(45) Date of Patent: May 31, 2016

(54) PRIVACY SCORING FOR CLOUD SERVICES

(71) Applicant: EMC Corporation, Hopkinton, MA (US)

(72) Inventors: Stephen Todd, Shrewsbury, MA (US); Rhonda Baldwin, Campbell, CA (US); David Dietrich, Hopedale, MA (US); Wayne A. Pauley, Jr., Hudson, NH (US)

(73) Assignee: EMC Corporation, Hopkinton, MA (US)

( * ) Notice: Subject to any disclaimer, the term of this patent is extended or adjusted under 35 U.S.C. 154(b) by 164 days.

(21) Appl. No.: 13/792,679

(22) Filed: Mar. 11, 2013

(51) Int. Cl.
*H04L 29/06* (2006.01)

(52) U.S. Cl.
CPC ........................ *H04L 63/20* (2013.01)

(58) Field of Classification Search
CPC ........................................................ H04L 63/20
See application file for complete search history.

(56) References Cited

U.S. PATENT DOCUMENTS

| | | | |
|---|---|---|---|
| 8,256,006 B2 * | 8/2012 | Grzymala-Busse et al. | 726/26 |
| 8,763,131 B2 * | 6/2014 | Archer et al. | 726/25 |
| 2006/0036690 A1 * | 2/2006 | O'Neil | 709/206 |
| 2006/0085750 A1 * | 4/2006 | Easton | G06F 9/4446 715/708 |
| 2007/0100650 A1 * | 5/2007 | Ramer | G06F 17/30749 705/26.1 |
| 2007/0162396 A1 * | 7/2007 | Goldman | G06F 17/30873 705/51 |
| 2011/0167474 A1 * | 7/2011 | Sinha et al. | 726/1 |
| 2011/0246283 A1 * | 10/2011 | Yarvis et al. | 705/14.36 |
| 2012/0198511 A1 * | 8/2012 | Sarferaz | 726/1 |
| 2014/0201111 A1 * | 7/2014 | Kasravi et al. | 706/12 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Jeffrey Pwu
*Assistant Examiner* — Wasika Nipa
(74) *Attorney, Agent, or Firm* — Ryan, Mason & Lewis, LLP

(57) ABSTRACT

Information processing techniques for generating privacy ratings for services that are available via a cloud infrastructure, e.g., cloud services. For example, a method comprises the following steps. Data indicative of privacy attributable to at least one of a service and a provider of the service accessible in a cloud infrastructure is collected. A privacy rating is generated for at least one of the service and the provider of the service based on at least a portion of the collected data.

20 Claims, 4 Drawing Sheets

PRIVACY SCORING FOR CLOUD SERVICES

FIELD

The field relates to distributed virtual infrastructure such as cloud infrastructure, and more particularly to techniques for generating privacy ratings for services that are available via such a cloud infrastructure.

BACKGROUND

Many distributed computing networks today are being implemented via a distributed virtual infrastructure, also referred to as a cloud infrastructure. The term "cloud" describes a collective computing platform that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Given the prevalence of the cloud computing paradigm in distributed computing networks today along with its on-demand capabilities, service providers are adding available cloud services to such networks on a daily basis. However, a problem that cloud service users have is how to gauge if a particular service is going to harvest privacy information or intellectual property and create a potential risk of exposure to the user or their company.

SUMMARY

Embodiments of the present invention provide information processing techniques for generating privacy ratings for services that are available via a cloud infrastructure, e.g., cloud services.

In one embodiment, a method comprises the following steps. Data indicative of privacy attributable to at least one of a service and a provider of the service accessible in a cloud infrastructure is collected. A privacy rating is generated for at least one of the service and the provider of the service based on at least a portion of the collected data.

In another embodiment, a computer program product is provided which comprises a processor-readable storage medium having encoded therein executable code of one or more software programs. The one or more software programs when executed by a processing device implement steps of the above-described method.

In other embodiments, an apparatus and a system comprise a memory and a processor operatively coupled to the memory and configured to perform steps of the above-described method.

Advantageously, illustrative embodiments described herein provide a cloud service privacy scoring system that allows the consumer of a cloud service to assess the risk of using the service. The risk is presented to the user by providing a rating that represents the aggregation of several metrics into a composite rating that allows the consumer to make a decision on whether or not to use/consume the service. The rating allows the consumer to either mask/protect information from being shared or to negotiate new terms of service (e.g., price, service level agreement, etc.) with the cloud service provider.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the phrase "cloud service" is intended to refer to a function, process, operation, capability, or the like, accessible via a cloud infrastructure (e.g., cloud computing or storage system). A "cloud service provider" is an entity that provides a cloud service.

It is to be appreciated that while a privacy rating/score is described herein for a cloud service or for a cloud service provider, a privacy rating/score computed for one of the service or the provider, by extension, reflects a privacy rating/score for the other of the service or the provider. Nonetheless, methodologies described herein can be used for computing a privacy rating/score for either a cloud service or a cloud service provider, or for both.

Further, it is to be understood that the terms "rating" and "score" may be interchangeably used herein. If a different meaning is intended, it will be evident from the context of the description.

Figure 1A:
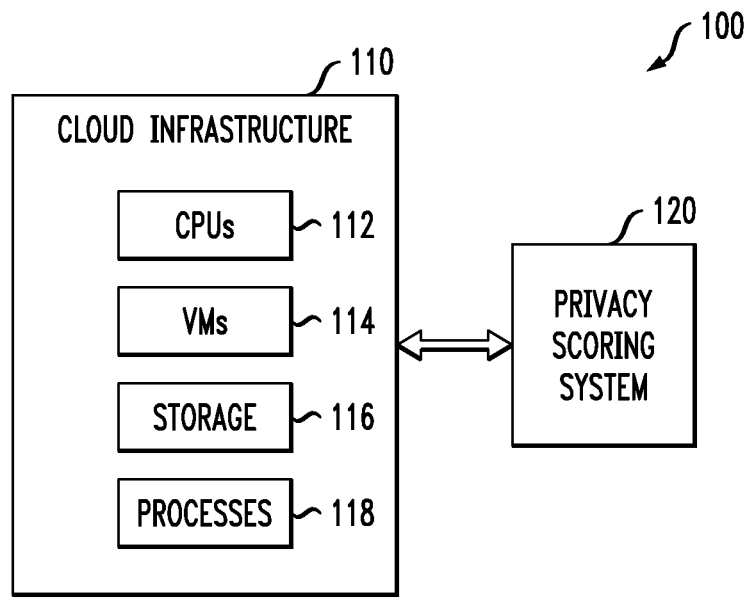
FIG. 1A shows cloud infrastructure and a cloud service privacy scoring system, in accordance with one embodiment of the invention.

FIG. 1A shows a system 100 configured in accordance with an illustrative embodiment of the present invention. The system 100 comprises cloud infrastructure 110 and a cloud service privacy scoring system 120. Again, by "cloud service privacy scoring," it is meant to include scoring of the service, the provider, or both. As will be explained in detail below, the cloud service privacy scoring system 120 utilizes a combination of current information and historical information to rate the privacy risk exposure of a cloud service. The use of natural language processing and machine learning methods, in one or more embodiments, enables a particular cloud service to be rated algorithmically each time the site offering the cloud service is engaged. Cloud infrastructure 110 is illustratively depicted in the figure as comprising an execution environment with execution components comprising one or more central processing units (CPUs) 112, one or more virtual machines (VMs) 114, and storage devices 116 (upon which logical units (LUs) are implemented) that execute one or more processes 118 that operate on one or more process input data sets that generate one or more process output data sets. It is to be appreciated that the cloud services that the system 120 rates are implemented in the cloud infrastructure 110 (thus, it may also be referred to as a cloud services infrastructure 110).

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the cloud service privacy scoring system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
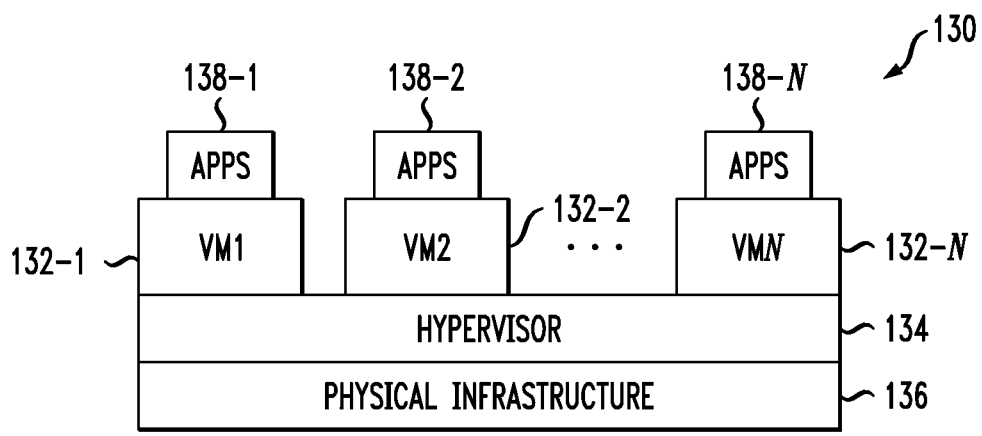
FIG. 1B shows a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated logical storage units or LUNs) under the control of the hypervisor 134.

Although only a single hypervisor 134 is shown in the example of FIG. 1B, a cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer (physical infrastructure 136) dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
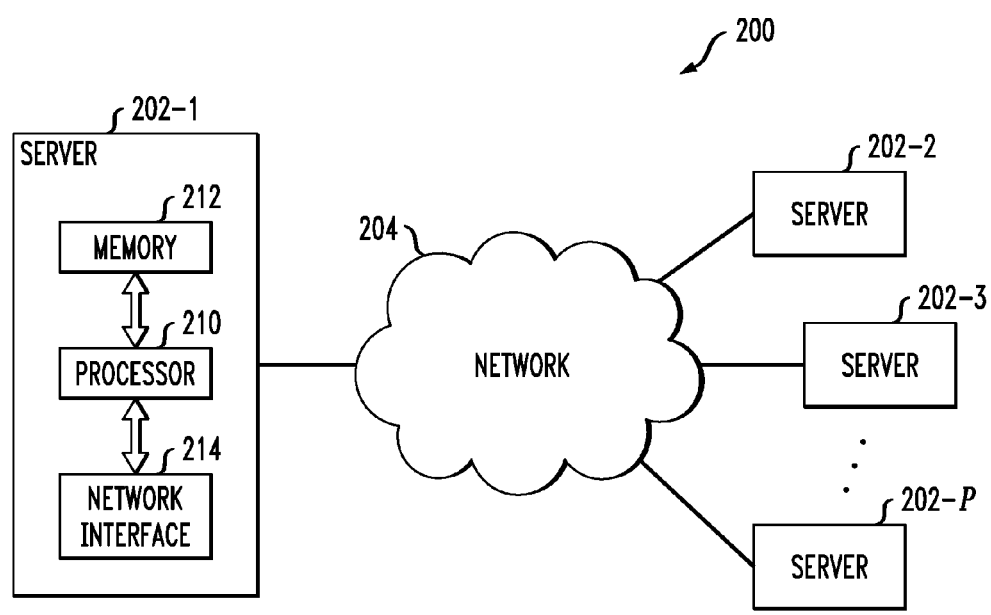
FIG. 2 shows a processing platform on which the cloud infrastructure and the cloud service privacy scoring system of FIG. 1A are implemented, in accordance with one embodiment of the invention.

An example of a processing platform on which the cloud infrastructure 110 and/or the cloud service privacy scoring system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the cloud service privacy scoring system 120, as well as operations of elements of system 120, will now be described with reference to FIGS. 3 and 4.

Embodiments of the invention realize that, in existing cloud service environments, when a consumer connects with a given cloud service (programmatically), the consumer has no way of knowing the privacy risk associated with the service. This privacy risk includes, but is not limited to, data that the service might collect, breach resilience, and sharing policies. Also, it is realized that there is no way, in existing cloud service environments, to throttle or negotiate the information that will be shared with the cloud service. It is further realized that negotiation allows a consumer to either anonymize or mask some of the data he/she allows the cloud service to collect, and to agree on a new price for the service based on the information the consumer is willing to share. Still further, it is realized that when a consumer connects with a cloud service, in existing cloud service environments, there is no way to evaluate the previous interactions (history) with the service and determine if the service has improved in terms of its privacy risk or intellectual property exposure risk.

Embodiments of the invention provide techniques to specifically help the consumer (programmatically) determine what the privacy rating is for a requested service from a cloud service provider. The rating represents data sourced not only from the provider, but also historical interaction with the provider, and the rating allows the consumer to either mask/protect information from being shared or to negotiate new terms of service (e.g. price, service level agreement (SLA), etc.) with the cloud service provider.

For example, in one embodiment, a privacy rating (or score) is created by aggregating and scoring information related to the cloud service including, but not limited to, an evaluation of the provider's privacy notice, data types and amount of data that the provider collects, how collected data is used, how long collected data is retained, breach history, press releases from the cloud service (e.g., Google™ consolidated privacy policies) across all policies, business partners and contractual agreements that the cloud service provider has with other companies and what type of data flows in each direction, and historical information based on previous interactions with the provider. The rating is derived by calculating a value using assigned and standardized values for specific data types that are most frequently collected by the provider.

For example, embodiments generate and assign a score to a given provider. Scoring can be done on an absolute scale for a given set of criteria (e.g., if provider does not have a privacy statement at all, perhaps they are automatically a 1 on a 1-10 scale). Scoring can also be done by rating multiple cloud providers and creating a relative scoring model (for instance, Provider A is a 1, Provider B is a 5, and Provider C is an 8). In the first scoring case, the system establishes a concrete criteria for rating a cloud provider high or low. While in the second scoring case, the system cares less about the absolute score, and more about the relative privacy of each provider, so one knows which is the most and least private, and gradations for each (these relative scores can translate to low risk, medium risk, medium-high risk, high risk, or the like).

In one or more embodiments, natural language processing (NLP) techniques are employed. For example, a weighted scoring system such as a term frequency-inverse document frequency (TF-IDF) methodology using key terms is employed that can algorithmically increase or decrease the providers rating given the frequency the term is discussed by the service provider in the privacy notice and elsewhere in their cloud service.

Such a privacy scoring system is able to quantify how well a cloud service provider adheres to documented industry standard policies and practices, and provides a contextual rating that yields a real time evaluation of the privacy risk which includes the most recent changes to the cloud services privacy standards.

Based on the privacy rating, the consumer is able to negotiate limits on the data allowed to be shared with the cloud service in exchange for lower/higher terms of service which include price, requirement for insurance, or SLA, as a few examples.

An additional way to leverage the NLP techniques is to use this as an input for an index using decision trees, to classify cloud service providers as high risk, low risk, etc. and use this decision tree as a self-learning algorithm to refine these classifications in an automated manner over time. In this way, the rating methodology includes a machine learning algorithm that crawls the web, finds cloud providers, rates them, and provides a list of which providers are viable for a given purpose or use case. The methodology is also able to identify the key factors in this analysis that influence a high-risk or a low-risk rating.

Also, the crawling of the web may include collecting information regarding the cloud services adherence to standards. This includes breach events (non-adherence), registry services (e.g., Cloud Security Alliance STAR registry) and other standards bodies. By including this aspect, the rating can be adjusted factoring in standards adherence.

Embodiments of the privacy scoring system can be used in a wide variety of scenarios, a few of which are now described:

(1) Engagement Evaluation. In this scenario, an initial query is sent by the consumer to engage the cloud service and, in response, the rating is presented to the consumer using an ordinal scale. The value is assessed by the consumer to determine to engage or not engage the service.

(2) Negotiation Scoring Mechanism. If the choice is to engage the service, then the consumer assesses the following: (i) will information be masked and if so which information will be masked? (For example, location services will not be shared, however, user name and cell number will be shared); (ii) all the above information will be provided, however, a negotiation will take place to either change the price or some other characteristic in the terms of service.

(3) NLP Scoring Mechanism. In this scenario, an NLP scan is made of the cloud service site on behalf of the consumer and, based on the number of times the phrase "data is shared with $3^{rd}$ parties" (or the like) is found, the static rating is adjusted up or down in real time.

(4) NLP Standards Scoring. In this scenario, NLP scans are made of the cloud service site on behalf of the consumer. Then, site adherence is compared to industry standards by also NLP scanning standards sites. For example, assume the cloud provider site claims to be SSAE-16 compliant. Thus, the web crawler algorithm includes a scan of the Cloud Security Alliance website to include the CSA's STAR registry data to assess adherence level to the SSAE-16 standard.

Figure 3:
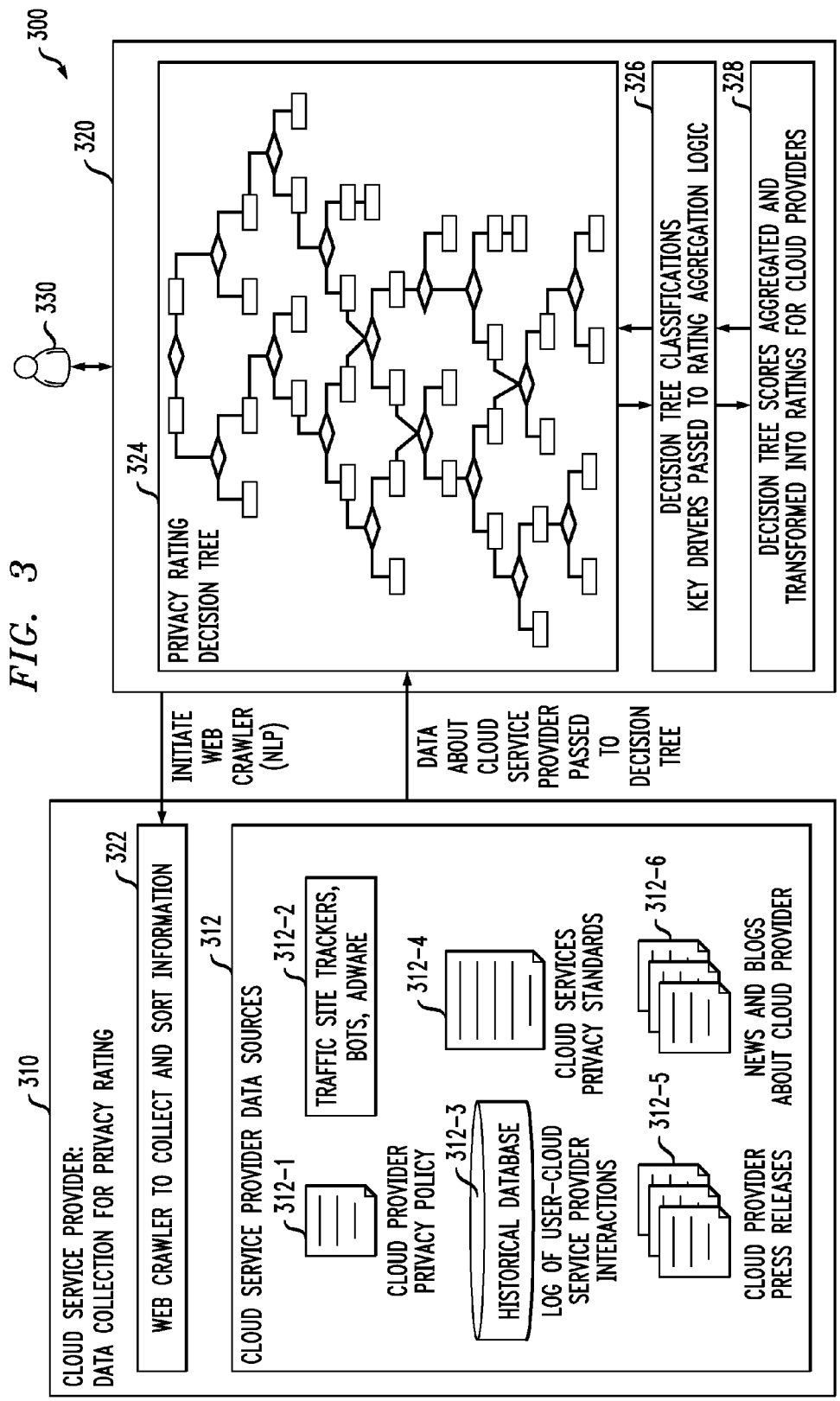
FIG. 3 shows a cloud service privacy scoring system environment, in accordance with one embodiment of the invention.

Turning now to FIG. 3, a cloud service privacy scoring system environment 300 is shown, in accordance with one embodiment of the invention. System environment 300 is configured to provide the cloud service privacy scoring mechanisms described above.

As shown, environment 300 includes a cloud service provider 310 and a cloud service privacy scoring system 320. Cloud service provider 310 corresponds to at least a part of cloud infrastructure 110 in FIG. 1A, while cloud service privacy scoring system 320 corresponds to system 120 in FIG. 1A. Entity 330 represents a user (e.g., administrator, customer, consumer, system, etc.) that wishes to obtain a privacy rating for one or more cloud services and/or one or more cloud service providers. Note that while only one cloud service provider is depicted in FIG. 3, the system 320 can perform privacy scoring calculations, simultaneously or substantially simultaneously, for multiple cloud service providers. Likewise, the system 320 can perform privacy scoring calculations, simultaneously or substantially simultaneously, for multiple cloud services of the same service provider. Thus, services and providers can be compared based on their ratings so that the entity 330 can make an informed choice whether or not to engage a particular service or provider.

As shown in FIG. 3, the cloud service privacy scoring system 320 includes a web crawler module 322 (shown at cloud service provider 310 to emphasize remote data collection operation), a decision tree module 324, a decision tree classification module 326, and a rating aggregation logic module 328. It is to be appreciated that while a decision tree is employed in the illustrative embodiments described herein, other classification algorithms can be used in its place, depending on the context.

As mentioned above, the web crawler component 322 collects data from the cloud service provider site which is then used by the system 320 to generate a privacy score for a given cloud service and/or for the cloud service provider itself. Note that the phrase "web crawler" is used in the case when the communication network over which the cloud service is provided is the World Wide Web and the cloud service is accessible through a web site of the service provider. However, data collection may be similarly accomplished by a crawler module that is not necessarily web-enabled.

Thus, as shown, data sources 312 from which data is collected about the cloud service provider and/or cloud service include, but are not limited to, a cloud provider privacy policy 312-1, traffic site trackers, bots and adware 312-2, a log of user-cloud service provider interactions 312-3, cloud service privacy standards 312-4, cloud service press releases 312-5, and news and blogs about the cloud service provider 312-6. Note that some of the data collected comes directly from the cloud service provider site (e.g., 312-1, 312-3, 312-4 and 312-5) while other data collected is from sites other than the cloud service provider site (e.g., 312-2 and 312-6). A larger or smaller number of data sources than illustratively shown in FIG. 3 can be used to generate a privacy score in accordance with alternative embodiments.

As mentioned above, well-known natural language processing (NLP) techniques can be used to collect and sort data from the various data sources 312. Those ordinarily skilled in the information processing art will appreciate how such well-known NLP techniques can be employed in a straightforward manner in various embodiments of the invention. As such, descriptions of NLP techniques are not provided herein but rather are available in well-known NLP literature.

As further shown, the collected data is passed to the decision tree module 324 of the system 320. An example of a decision tree that is implemented in module 324 will be described below in the context of FIG. 4. Decision tree classification module 326 passes key drivers to rating aggregation logic module 328.

Key drivers, in terms of an algorithm or a model, generally refer to the variables or "predictors" that are the most influential in determining the outcome of the test or set of tests. Thus, the decision tree module 324 and decision tree classification module 326 operate together to classify the information received from the web crawler module 322 and determine which criteria are the most salient and influential in determining a privacy rating for a given cloud provider, and how the provider scores.

For example, decision tree module 324 passes raw percentages or decimals to decision tree classification module 326 which converts this raw data into scores on a scale (such as, for example, 1-10) where they can become aggregated, sorted and organized in the rating aggregation logic module 328. That is, the rating aggregation logic module 328 aggregates and transforms the scores into a rating for the cloud service provider and/or cloud service. It is important to note that the scoring that occurs in the system 320 is not static, and this is a main purpose of the web crawler 322 to mine the contents of data sources 312. In other words, as the crawler finds new information about the provider on the web, it feeds this input back to the system 320 to refresh the scoring that occurs by the decision tree or other classification algorithm.

The rating generated by logic module 328 is then presented to the entity 330 that can then decide whether or not to engage the particular cloud service or the cloud service provider. The decision to engage the service can be manually made by the user, or automatically based on the rating.

Figure 4:
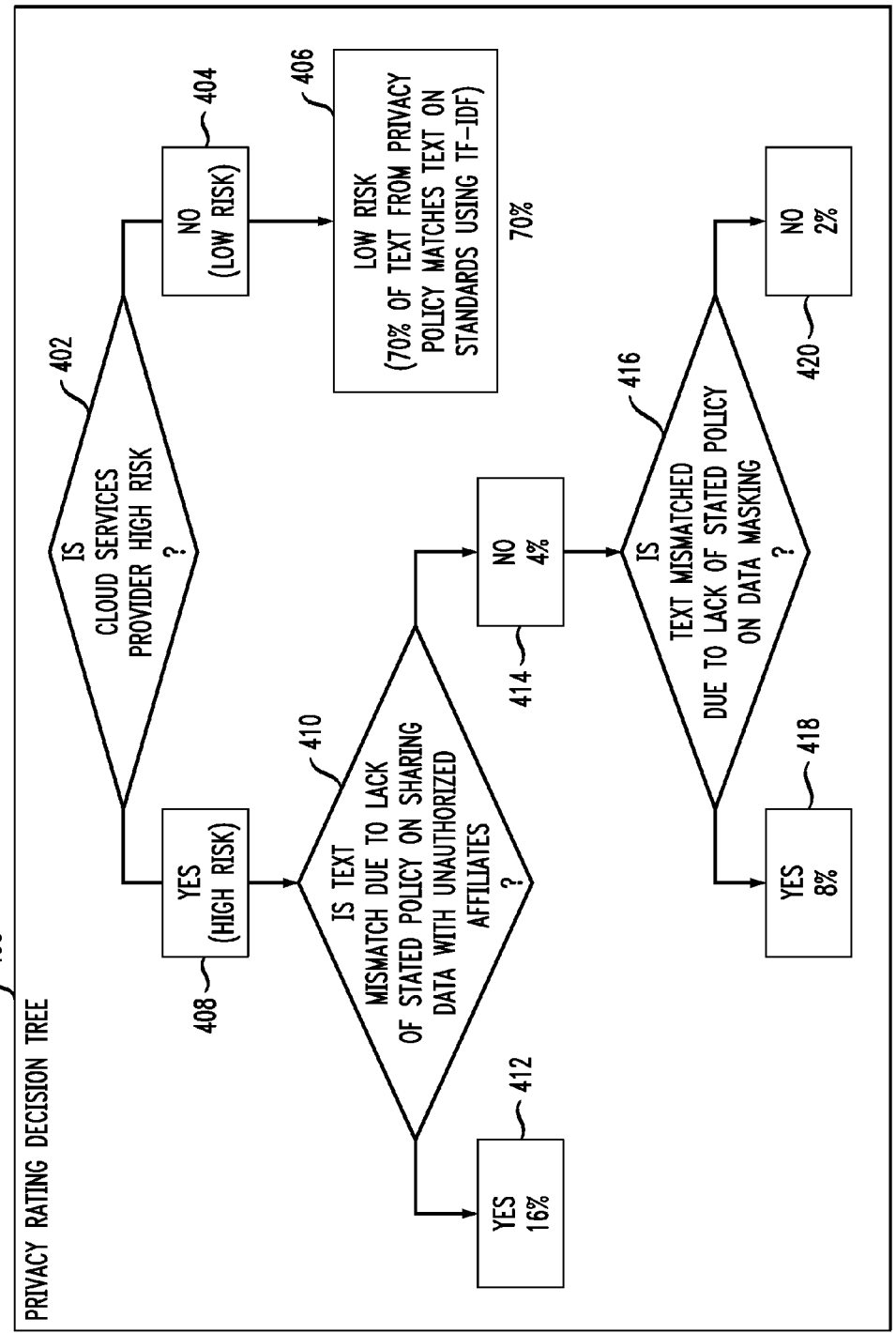
FIG. 4 shows a privacy rating decision tree, in accordance with one embodiment of the invention.

FIG. 4 shows an example of a privacy rating decision tree that may be implemented by decision tree module 324 of FIG. 3. As shown in decision tree 400, the main decision node 402 determines whether or not the cloud service provider is a high risk or a low risk based on the data collected via the NLP-enabled web crawler module 322 in FIG. 3. This determination is made from the child nodes below the parent node.

Note that a low risk (decision tree blocks 404 and 406) may be determined when 70 percent of the text from the privacy policy on the provider site (312-1 in FIG. 3) matches the text in a particular privacy standard (e.g., SSAE-16 standard). This can be determined using a TF-IDF methodology as mentioned above. It is to be appreciated that 70 percent is just an example and could be set to be a higher or lower percentage.

However, in accordance with high risk decision tree blocks 408 and 410, a determination is made whether or not the text mismatch between the privacy policy of the provider and the given privacy standard is due to the lack of a stated policy on sharing customer data with unauthorized affiliates. It is to be understood that since the decision tree is a classification algorithm, it is trying to classify what occurred in these tests. In this case, the decision tree is representing that to be considered "low risk," this means that at least 70 percent of the text of the subject privacy statement matches the industry standards. The branch of the decision tree that is "high risk" represents the other 30 percent. Thus, the 16 percent (block 412) represents the high risk providers that lack a stated policy on sharing data. The 4 percent (block 414) represents providers that do have a stated policy, but are high risk for other reasons.

In accordance with high risk decision tree blocks 416, 418 and 420, a determination is made whether or not the text mismatch between the privacy policy of the provider and the given privacy standard is due to the lack of a stated policy on data masking. As above, the 8 percent (block 418) are those providers that do not have a text mismatch due to lack of stated policy on sharing data with unauthorized affiliates, and do have a text mismatch due to lack of stated policy on data masking. The 2 percent (block 420) do not have a text mismatch due to lack of stated policy on data masking, so they must be considered high risk for another reason (not shown in this simple example).

Note that the decision tree module 324 passes the above percentages to the classification module 326 along with other diagnostic information that is an output of the model. For instance, aside from this simple example, there are other parameters that a decision tree can produce to determine if it is a robust tree or not. Thus, it is to be understood that the decision tree 400 in FIG. 4 is only one example of a decision tree that may be used to generate scores for rating the privacy afforded by a given cloud service and/or cloud service provider.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
collecting data indicative of privacy attributable to at least one of a service and a provider of the service accessible in a cloud infrastructure;
generating a privacy rating for at least one of the service and the provider of the service based on at least a portion of the collected data, wherein the privacy rating is generated utilizing a decision tree to evaluate at least a portion of the collected data, the decision tree comprising two or more decision nodes, each decision node computing a score for a privacy criteria, wherein the scores are aggregated to generate the privacy rating, and wherein evaluation of at least a portion of the collected data by the decision tree comprises comparing at least a portion of the collected data to one or more privacy standards and determining a text-match percentage between at least a portion of the collected data and the one or more privacy standards, comparing the text-match percentage to a specified threshold, and classifying the provider as a first type privacy violation risk when the text-match percentage is at least below the specified threshold and a second type privacy violation risk when the text-match percentage is at least above the specified threshold; and
enabling negotiation of one or more aspects of the service between a user of the service and the provider of the service based on the generated privacy rating;
wherein at least part of the collecting, generating and enabling steps are performed by at least one processing device comprising a processor coupled to a memory.

2. The method of claim 1, further comprising deciding whether or not to engage the service from the provider based on the generated privacy rating.

3. The method of claim 1, wherein the data collecting step further comprises utilizing one or more natural language processing techniques to collect at least a portion of the data.

4. The method of claim 3, wherein at least one of the one or more natural language processing techniques comprises a term frequency-inverse document frequency methodology.

5. The method of claim 1, wherein the data collecting step further comprises crawling one or more sites to collect at least a portion of the data.

6. The method of claim 1, wherein the data collecting step further comprises collecting the data indicative of privacy attributable to at least one of a service and a provider of the service from one or more data sources.

7. The method of claim 6, wherein the one or more data sources comprise at least one of a privacy policy of the provider, the one or more privacy policy standards, and a log of interactions with at least one of the service and the provider.

8. The method of claim 1, wherein the privacy rating is indicative of a risk associated with engaging the service from the provider.

9. The method of claim 8, wherein the risk is a function of at least one of a data sharing policy and a data masking policy of the provider of the service.

10. A computer program product comprising a processor-readable storage medium having encoded therein executable code of one or more software programs, wherein the one or more software programs when executed by the processor of the processing device implement the steps of the method of claim 1.

11. An apparatus comprising:
a memory; and
a processor operatively coupled to the memory and configured to: collect data indicative of privacy attributable to at least one of a service and a provider of the service accessible in a cloud infrastructure; generate a privacy rating for at least one of the service and the provider of the service based on at least a portion of the collected data, wherein the privacy rating is generated utilizing a decision tree to evaluate at least a portion of the collected data, the decision tree comprising two or more decision nodes, each decision node computing a score for a privacy criteria, wherein the scores are aggregated to generate the privacy rating, and wherein evaluation of at least a portion of the collected data by the decision tree comprises comparing at least a portion of the collected data to one or more privacy standards and determining a text-match percentage between at least a portion of the collected data and the one or more privacy standards comparing the text-match percentage to a specified threshold, and classifying the provider as a first type privacy violation risk when the text-match percentage is at least below the specified threshold and a second type privacy violation risk when the text-match percentage is at least above the specified threshold; and enable negotiation of one or more aspects of the service between a user of the service and the provider of the service based on the generated privacy rating.

12. The apparatus of claim 11, wherein the processor is further configured to enable a decision whether or not to engage the service from the provider based on the generated privacy rating.

13. The apparatus of claim 11, wherein the data collection further comprises utilizing one or more natural language processing techniques to collect at least a portion of the data.

14. A system comprising:
a data collector configured to collect data indicative of privacy attributable to at least one of a service and a provider of the service accessible in a cloud infrastructure; and
a privacy rating generator operatively coupled to the data collector and configured to generate a privacy rating for at least one of the service and the provider of the service based on at least a portion of the collected data, wherein the privacy rating is generated utilizing a decision tree to evaluate at least a portion of the collected data, the decision tree comprising two or more decision nodes, each decision node computing a score for a privacy criteria, wherein the scores are aggregated to generate the privacy rating, and wherein evaluation of at least a portion of the collected data by the decision tree comprises comparing at least a portion of the collected data to one or more privacy standards and determining a text-match percentage between at least a portion of the collected data and the one or more privacy standards, comparing the text-match percentage to a specified threshold, and classifying the provider as a first type privacy violation risk when the text-match percentage is at least below the specified threshold and a second type privacy violation risk when the text-match percentage is at least above the specified threshold;

wherein one or more aspects of the service are negotiated between a user of the service and the provider of the service based on the generated privacy rating, and the data collector and the privacy rating generator are implemented by at least one processing device comprising a processor coupled to a memory.

15. The method of claim 1, wherein the step of enabling negotiation of one or more aspects of the service between a user of the service and the provider of the service based on the generated privacy rating further comprises the user specifying data to be shared in accordance with the service based on the generated privacy rating.

16. The method of claim 1, wherein the step of enabling negotiation of one or more aspects of the service between a user of the service and the provider of the service based on the generated privacy rating further comprises adjusting at least one engagement term associated with the service based on the generated privacy rating.

17. The method of claim 1, wherein the step of enabling negotiation of one or more aspects of the service between a user of the service and the provider of the service based on the generated privacy rating further comprises the user specifying data to be masked in accordance with the service based on the generated privacy rating.

18. The method of claim 1, wherein the privacy rating is generated based on historical interactions with the provider, a value calculated using assigned and standardized values for specific data types collected by the provider, and the provider's adherence to the one or more privacy standards.

19. The method of claim 1, wherein the privacy rating represents the privacy of the provider relative to one or more other providers of a service.

20. The method of claim 1, wherein the first type privacy violation risk is a high privacy violation risk and the second type privacy violation risk is a low privacy violation risk.

* * * * *